United States Patent [19]

Charlton

[11] 4,270,180
[45] May 26, 1981

[54] DELAY LINE TIME COMPRESSION CORRELATION CIRCUIT

[75] Inventor: John D. Charlton, Canyon Country, Calif.

[73] Assignee: The Bendix Corporation (Electrodynamics Div), N. Hollywood, Calif.

[21] Appl. No.: 92,823

[22] Filed: Nov. 9, 1979

[51] Int. Cl.³ .......................................... G06F 15/336
[52] U.S. Cl. ............................ 364/728; 343/100 CL; 364/604; 367/125
[58] Field of Search ............................ 364/604, 728; 343/100 CL; 367/40, 41, 42, 100, 125; 324/77 G, 77 H

[56] References Cited

U.S. PATENT DOCUMENTS

| | | | |
|---|---|---|---|
| 3,449,553 | 6/1969 | Swan | 364/728 X |
| 3,750,152 | 7/1973 | Waful | 367/100 |
| 3,777,133 | 12/1973 | Beck et al. | 324/77 H |
| 3,786,405 | 1/1974 | Chramiec | 367/100 X |
| 4,162,533 | 7/1979 | Ricci | 364/728 |
| 4,198,704 | 4/1980 | Munson | 343/100 CL X |
| 4,203,164 | 5/1980 | Isaak et al. | 343/100 CL X |

Primary Examiner—Joseph F. Ruggiero
Attorney, Agent, or Firm—Jackson, Jones & Price

[57] ABSTRACT

A delay line time compression correlation circuit for correlating two sets of serial data is disclosed, and includes a counter for defining the number of data pairs that have been correlated and the amount of time shift between the two sets of serial data. The two sets of serial data are digital samples of two clipped analog input signals which are simultaneously sampled as a function of the correlation count value. The samples are stored and serially cross-correlated with predetermined time displacements between the two sets of data. The correlation results for each particular time displacement are summed with such total being provided as an output while the correlation for the subsequent time displacement takes place.

13 Claims, 2 Drawing Figures

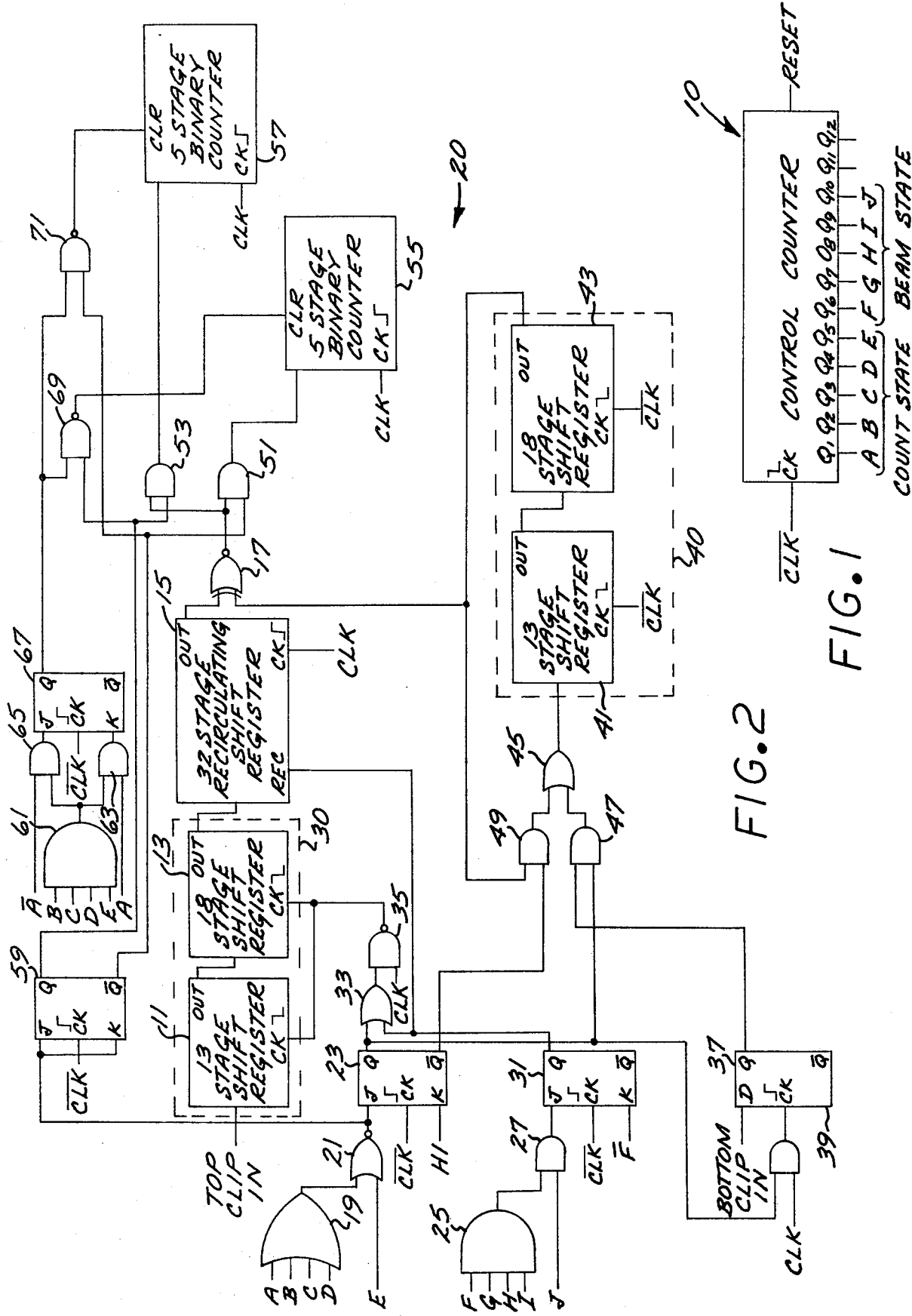

DELAY LINE TIME COMPRESSION CORRELATION CIRCUIT

BACKGROUND OF THE INVENTION

The disclosed invention relates to time compression correlation of signals that very with time. Particularly, the disclosed invention is directed to a delay line correlation circuit commonly referred to by the acronym DELTIC (Delay Line Time Compressor) for use in a sonar system.

Time compression correlation circuits are generally known in the art, and examples of such prior art are in U.S. Pat. No. 3,354,297, issued Nov. 21, 1967 to G.W. Anderson et al, and U.S. Pat. No. 3,449,553, issued on June 10, 1969. The application of time compression correlation circuits in sonar system is discussed in Allen and Westerfield, *Digital Compressed—Time Correlators and Matched Filters for Active Sonar,* The Journal of the Acoustical Society of America, Vol. 36, No. 1, page 121 (January 1964).

Also known in the art is the application of time compression correlation circuits in sonar systems for beam forming. See, for example, Allen and Westerfield, referenced above, at page 122. Briefly, beam forming involves the correlation of two sets of variable data wherein each set is representative of the output of a corresponding hydrophone. Such correlation can be performed by a DELTIC. Each respective set of variable data is in correct time sequence, but the respective sets of data will be selectively time displaced with respect to each other. Since the spacing of the hydrophones is known, a particular time displacement represents pressure waves from a particular direction. That particular direction can be referred to as a beam angle. Thus, the hydrophone pair can be considered as looking at a given direction as a function of time displacement. Obviously, for zero time displacement, the direction being examined is perpendicular to the line segment drawn between hydrophones. Time displacement will result in a beam angle with respect to such perpendicular direction.

Prior art time compression correlators, however, have several disadvantages. For example, the system of U.S. Pat. No. 3,354,297 utilizes a complicated electromechanical magnetic storage drum. The system of U.S. Pat. No. 3,449,553 is complex and requires a large number of components. Still other systems require high clocking frequencies or critical timing. In some systems, race paths are utilized which could result in lost or erroneous data, thereby reducing the reliability of such race path systems. Another disadvantage of prior art systems is excessive power dissipation, often resulting from high frequency timing requirements.

Therefore, it is an object of the subject invention to provide an improved delay line time compression correlation circuit which uses the minimum clock frequency necessary for performing the correlation functions.

Another object of the disclosed invention is to provide an improved delay line time compression correlation circuit which does not use race paths and has increased reliability.

A further object of the subject invention is to provide an improved delay line time compression correlation circuit with low power dissipation.

SUMMARY OF THE INVENTION

The delay line time compression correlation circuit of the disclosed invention includes logic circuitry for sampling and storing the respective clipped outputs of a pair of hydrophones. Corresponding stored samples are sequentially cross-correlated over a predetermined number of bits, and the results of the cross-correlations over such predetermined number of bits are summed. After such crosscorrelation over a predetermined number of bits, the stored clipped outputs for one hydrophone are shifted with respect to the stored clipped outputs from the other hydrophone. Then the cross-correlation and summing functions again take place with respect to the shifted stored samples. The logic circuitry performs its functions under the control of a binary counter, and the logic functions are defined to occur on a positive-going clock transition or a negativegoing clock transition. That is, the logic functions will occur during one of the two states defined by the clock transitions.

BRIEF DESCRIPTION OF THE DRAWING

The various objects, advantages and features of the disclosed delay line time compression correlation circuit will become more apparent to one skilled in the art from the following detailed description and claims when read in conjunction with the accompanying drawing wherein:

FIG. 1 is a schematic representation of the control counter of the disclosed delay line time compression correlation circuit.

FIG. 2 is a schematic diagram of a delay line correlation circuit which is controlled by the control counter of FIG. 1.

DETAILED DESCRIPTION OF THE DISCLOSURE

FIG. 1 is a schematic representation of a control counter 10 which provides the STATE TIME for the delay line time compression correlation circuit of the disclosed invention. The control counter 10 is a binary counter wherein the first ten stages are used to provide the STATE TIME. Specifically, the first five stages $Q_1$ through $Q_5$ are used to provide the COUNT STATE outputs A through E; and the next five stages $Q_6$ through $Q_{10}$ provide the BEAM STATE outputs F through J. $Q_1$ represents the lowest order, namely $2^1$, $Q_2$ represents $2^2$, and so forth. In the description of FIG. 2 that follows below, inverses of the some of the COUNT STATE and BEAM STATE outputs are utilized. Such inverses are identified as $\overline{A}, \overline{B}$, and so forth. Although the control counter 10 does not directly provide such inverse outputs, it is generally known in the art that an inverse signal can be provided by using a logical inverter. The control counter 10 increments by one on the negative-going transition of the $\overline{CLK}$ clock signal applied to the CK terminal, as symbolically indicated adjacent the CK terminal.

The control counter 10 is shown as a twelve stage binary counter wherein the two highest order outputs are not utilized for generating STATE TIME. However, the presence of the unused high order stages does not affect the STATE TIME sequences provided by the COUNT STATE and the BEAM STATE. An example of a commercially available binary counter that could be used as the control counter 10 is the RCA CD4040A. Of course, a ten stage binary counter that increments on a clock transition could be used to provide STATE TIME.

The clock signal $\overline{CLK}$ provided to the control counter 10 is the inverse the common clock signal CLK that is applied to the correlation circuit of FIG. 2, described further below. Therefore, in the drawing and in the following description, references to the clock signal CLK refer to the same signal, and $\overline{CLK}$ identifies the inverse of the CLK clock signal. Also, it should be pointed out that each of the logic elements shown in the drawing which require the input of a clock signal (and not necessarily the CLK or $\overline{CLK}$ signals) to function has a terminal identified as CK for accepting such clock signal. For ease of understanding, a symbol indicating the type of transition required by a particular logic element is shown on the drawing adjacent the CK terminal of such logic element.

FIG. 2 shows the logic elements that comprise a correlation circuit 20 which is controlled by the STATE TIME conditions provided by the control counter 10 (FIG. 1), and utilizes the CLK clock signal described above. The correlation circuit 20 contains logic elements which are responsive to the positive-going transition of the CLK clock signal or the negative-going transition of the CLK clock signal. Therefore, for ease of reference and understanding, EXECUTION of the logic is defined to occur on the positive-going transition of the CLK clock signal; and SETUP of the logic is defined to occur on the negative-going transition of the CLK clock signal. Of course, it is evident that EXECUTION occurs on the negative-going transition of the $\overline{CLK}$ clock signal, and SETUP occurs on the positive-going transition of the $\overline{CLK}$ clock signal.

The correlation circuit 20 of FIG. 2 includes a thirteen stage shift register 11 which receives the clipped output TOP CLIN IN from a hydrophone. The TOP CLIP IN signal is stored by the shift register 11 when a negative-going transition clock signal is applied to its CK input. As will be discussed herein, the clock signal selectively applied to the shift register 11 will be the inverse of the CLK clock signal. The output of the shift register 11 is applied to the input of an eighteen stage shift register 13 which, like the shift register 11, accepts an input when a negative-going transition clock signal is applied to its CK input. As shown in FIG. 2, the clock signal applied to the shift register 13 is the same as the clock signal applied to the shift register 11. Together, the shift registers 11 and 13 effectively form a 31 stage shift register, and will be collectively referred to as the top holding register 30. The top holding register 30 has been shown as two separate shift registers 11 and 13 since eighteen stage static shift registers are readily available commercially. For example, a pair of RCA CD4006A registers may be used to form the holding register 30.

The output of the top holding register 30 is applied to the input of a thirty-two stage recirculating shift register 15 which will also be referred to as the top circulating register. The top circulating register 15 will recirculate or shift its contents as a function of the logic level applied to its REC input. Particularly, it is contemplated that a logical zero applied to the REC input of the top circulating register 15 will cause the register to recirculate, and that the application of a logical one to the REC input will allow data to be accepted from the top holding register 30. The top circulating register 15 further includes a CK input for accepting the CLK clock signal which enables the recirculating shift register 15 to either recirculate or shift during EXECUTION of the logic. An example of a commercially available recirculating shift registers that may be used as the recirculating shift register 15 is the RCA-CD400100B. The output of the top circulating register 15 is applied to a dual input exclusive NOR gate 17.

The clocking of the top holding register 30 is controlled by the values of the COUNT STATE and the BEAM STATE. The recirculate or shift mode of the recirculating shift register 15 is controlled by the value of the BEAM STATE. Particularly, the A through D outputs of the COUNT STATE are applied to an OR gate 19, which in turn provides its output to a dual input NOR gate 21. The E output of the COUNT STATE is provided as the other input to the NOR gate 21. The output of the NOR gate 21 is applied to the J input of the J-K flip-flop 23 which also receives the $\overline{CLK}$ clock signal at its CK input. Thus, the J-K fliip-flop 23 can change state on the SETUP of the logic. A high level logical signal HI is applied to the K input of the J-K flip-flop 23. The signal provided at the Q output of the J-K flip-flop 23 is the logical inverse of the output provided at its $\overline{Q}$ output. The F through I outputs of the BEAM STATE are applied to an AND gate 25 which in turn provides its output to a dual input AND gate 27. The J output of the BEAM STATE provides the other input to the AND gate 27. The output of the AND gate 27 is applied to the J input of a J-K flip-flop 31. The $\overline{CLK}$ clock signal is applied to the CK terminal of the J-K flip-flop 31 which can change state upon SETUP of the logic. The inverse output $\overline{F}$ of the BEAM STATE is applied to the K input of the J-K flip-flop 31.

The Q outputs of the J-K flip-flops 23 and 31 are respectively applied as inputs to a dual input OR gate 33. The output of the OR gate 33 is applied as one input into a dual input NAND gate 35, which has the CLK clock signal as its other input. The output of the NAND gate 35 is applied as the clock signal to the CK terminals of the shift registers 11 and 13 that comprise the top holding register. Thus, a clock signal that is the inverse of the CLK clock signal is applied to the top holding register 30 by the NAND gate 35 whenever it is enabled by the OR gate 33. This occurs when either or both of the Q outputs of the J-K flip-flops 23 and 31 are at a high logical level.

A high logical level at the Q input of the J-K flip-flop 31 will control the top circulating register 15 to operate in the write mode to accept data from the top holding register 30. Particularly, when all of the BEAM STATE outputs become logical ones upon a particular EXECUTION of the logic, a logical zero will be present at the J input of the J-K flip-flop 23. This will cause a logical one to be present at the Q output of the J-K flip-flop 23 upon the subsequent SETUP of the logic. Data will then be transferred to the top circulating register 15 upon the subsequent thirty-two EXECUTIONS of the logic. This is due to the fivebit output comprising the COUNT STATE which will necessarily change to all logical zeros upon the EXECUTION of the logic that results in the BEAM STATE becoming all logical ones. Therefore, the BEAM STATE will continue to provide all logical one outputs until the COUNT STATE has incremented through its maximum value (all logical ones) to all zero outputs again. Upon the EXECUTION of the logic that causes the COUNT STATE to provide all logical zero outputs, the BEAM STATE outputs will change from all logical ones to all logical zeros, thus causing a logical zero to be applied at the J input of the J-K flip-flop 31 and a logical one ($\overline{F}$) to be applied to the K input of the J-K flip-flop 31. On the SETUP of the logic subsequent to such inversion of the inputs to the J-K flip-flop 31, the Q output of the J-K flip-flop 31 will change to a logical zero; and the top circulating register 15 will then be in the recirculate mode by virtue of the logical zero applied to its REC input. The top circulating register 15 will remain in the recirculate mode until a BEAM STATE output of all logical ones causes data transfer from the top holding register 30 to the top circulating register 15, as discussed above.

The correlation circuit of FIG. 2 further accepts the clipped output from another hydrophone. This signal is identified as BOTTOM CLIP IN and is applied to the D input of a D-type flip-flop 37 which receives a clock signal at its CK terminal from a dual input AND gate 39. The inputs to the AND gate 39 are provided by the Q output of the J-K flip-flop 23 and the CLK clock signal, respectively. Therefore, the flip-flop 37 will be enabled to provide an output at its Q terminal representative of the BOTTOM CLIP IN under the control of the J-K flip-flop 23. Specifically, data will be transferred into the flip-flop 37 upon the EXECUTION of the logic after the EXECUTION of the logic which results in all of the COUNT STATE outputs obtaining logical zero levels. It should therefore be apparent that the sampling rate of the TOP CLIP IN and the BOTTOM CLIP IN is the same and the sampling takes place at the same time as controlled by the output of the J-K flip-flop 23. Specifically, new samples are entered into the top holding register 30 and the flip-flop 31 when the COUNT STATE increments to provide all logical zero outputs, which will occur after the COUNT STATE increments through its maximum value of decimal thirty-one. This corresponds to a complete recirculation of the top circulating register 15. In effect, new samples (TOP CLIP IN and BOTTOM CLIP IN) are entered after each complete recirculation of the top circulating register 15. It should also be noted that the BEAM STATE will increment by one on the EXECUTION of the logic after the COUNT STATE reaches its maximum value. It should therefore be recognized that each complete circulation of the recirculating shift register 15 corresponds to one BEAM STATE output value.

The BOTTOM CLIP IN sampled data is circulated in a 31 stage shift register that includes a 13 stage shift register 41 and an 18 stage shift register 43, both of which are adapted to shift upon EXECUTION of the logic as determined by the $\overline{CLK}$ clock signal that is applied to the CK terminals of the respective registers 41 and 43. The shift registers 41 and 43 will collectively be referred to as the bottom circulating register 40. As noted previously, commercially available 18 stage shift registers which could be used as the registers 41 and 43 include the RCA CD4006A. As is readily apparent, the bottom circulating register 40 shifts sychronously with the top holding register 15.

The inputs to the bottom holding register 40 is provided through a dual input OR gate 45 which receives its inputs from a pair of dual input AND gates 47 and 49. The dual input AND gate 47 transmits the contents of the flip-flop 37 when such AND gate 47 is enabled by the output of the J-K flip-flop 23. The dual input AND gate 49 controls the circulation of the output of the bottom circulating register 40 when such AND gate 49 is enabled by the $\overline{Q}$ output of the J-K flip-flop 23. Thus, it will be appreciated that the recirculation of the BOTTOM CLIP IN data in the bottom circulating register 40 is controlled by the output value of the COUNT STATE. When the COUNT STATE outputs are all logical zeros, data from the flip-flop 37 will be transferred through gates 47 and 45 into the bottom recirculating shift register 40 upon the EXECUTION of the logic which follows the EXECUTION of the logic that resulted in all of the COUNT STATE outputs obtaining logical zero levels. It will therefore be appreciated that new data will be transferred from the flip-flop 37 Q output into the bottom circulating register 40 on the same clock transition (EXECUTION) that causes new BOTTOM CLIP IN data to be sampled into the flip-flop 37.

From the foregoing, it should be apparent that the top holding register 30 and the flip-flop 31 concurrently sample and store input data (TOP CLIP IN and BOTTOM CLIP IN, respectively) upon the EXECUTION of the logic following the EXECUTION of the logic that causes all of the COUNT STATE outputs to be all logical zeros. When all of the COUNT STATE outputs become logical zeros, that indicates the end of a beam correlation and that a new correlation is about to begin. Such new beam correlation is further identified by the increment of the BEAM STATE outputs upon the same EXECUTION of the logic that causes all the COUNT STATE outputs to become zero.

Since the bottom circulating register 40 receives the $\overline{CLK}$ clock signal upon EXECUTION of the logic, it will shift sychronously with the top circulating register 15. Thus, corresponding values in the top circulating register 15 and the bottom holding register 40 will be applied simultaneously to the exclusive NOR gate 17. The output of the exclusive NOR gate 17 is applied to a pair of dual input AND gates 51 and 53 which in turn provide outputs to associated five stage binary counters 55 and 57, respectively. The AND gates 51 and 53 are alternately enabled as a function of the outputs of a J-K flip-flop 59. Thus, only one of the AND gates 51 or 53 will be transmitting the output of the exclusive NOR gate 17 to its associated five stage binary counter 55 or 57.

The five stage binary counters 55 and 57 receive the CLK clock signal at respective CK inputs, and are adapted to increment as a function of the inputs received from the AND gates 51 and 53, respectively, upon EXECUTION of the logic. Specifically, the binary counters 55 and 57 will increment upon EXECUTION of the logic only when a logical one is present from their associated AND gates 51 or 53. Thus, as a correlation result is being sensed by either five stage counter 55 or 57, new data bits are being outputed for correlation by the top circulating register 51 and the bottom circulating register 40. However, the output of new data bits from such registers does not affect the sensing of the prior correlation result by either five stage binary counter 55 or 57.

The J-K flip-flop 59 is controlled by the values of the COUNT STATE outputs as processed by the OR gate 19 and the NOR gate 21. The CK terminal of the J-K flip-flop 59 receives $\overline{CLK}$ clock signal at its CK input, thereby allowing it to change state upon SETUP of the logic. Thus, the J-K flip-flop 59 will invert its outputs on the SETUP of the logic following the EXECUTION of the logic that results in all of the COUNT STATE outputs being logical zeros. Each of the AND gates 51 and 53 will therefore be enabled alternately during such time that the COUNT STATE cycles from all logical zero outputs to all logical zero outputs again. That corresponds to the total number of shifts necessary for the top circulating register 15 to circulate through all of the data stored therein, and also corresponds to a correlation of all data for one beam. Since each complete cycle of the COUNT STATE from all zeros through all ones corresponds to a particular BEAM STATE value, each of the five stage binary counters 55 and 57 will count the number of coincidences detected by the exclusive NOR gate 17 during a particular BEAM STATE. Thus, the five stage binary counters 55 and 57 will total the number of coincidences for alternative BEAM STATES.

After one of the five stage binary counters (55 or 57) is finished totaling the coincidences for a particular BEAM STATE, its contents can be read out during a predetermined number of CLK clock signal periods. After such predetermined number of clock periods, the five stage binary counter that is being read will be cleared and reset to zero. The number of clock periods that will elapse prior to such clearing is controlled by the COUNT STATE outputs. Particularly, COUNT STATE outputs B through E are applied to an AND gate 61. The COUNT STATE output A is applied to a dual input AND gate 63; and its inverse, $\overline{A}$, is applied to another dual input AND gate 65. The output of the OR gate 61 provides the second input for each of the AND gates 63 and 65. The output of the AND gate 65 is applied to the J input of a J-K flip-flop 67 which further accepts the output of the AND gate 63 at its K input. The $\overline{CLK}$ clock signal is applied to the CK terminal of the J-K flip-flop 67, thereby allowing the flip-flop 67 to change its output state only upon SETUP of the logic. The Q output of the J-K flip-flop 67 is applied to a pair of dual input NAND gates 69 and 71 which have their outputs connected to the five stage binary counters 55 and 57, respectively. The Q output of the J-K flip-flop 59 provides the second input to the NAND gate 69; and the $\overline{Q}$ output of the J-K flip-flop 59 provides the second input to the NAND gate 71. Thus, only the NAND gate 69 or 71 corresponding to the five stage binary counter that is not summing the outputs of the exclusive NOR gate 17 will be enabled by the J-K flip-flop 59 to transmit the clear signal provided by the Q output of the J-K flip-flop 67. That clear signal is applied to the CLR input of either five stage binary counter 55 or 57 as determined by the NAND gates 69 and 71.

Since the top circulating register 15 contains thirty-two stages and the bottom circulating register 40 contains thirty-one stages, the respectively circulating data will shift with respect to each other by one shift register position upon every thirty-two shifts of the top circulating register 15. Each of the thirty-two comparisons provided by the exclusive NOR gate 17 during such thirty-two shifts corresponds to the correlation over one BEAM STATE. After the data in the top circulating register 15 has been compared for thirty-two BEAMS STATES, (identified by BEAM STATE output values zero through thirty-one) new input data will be provided from the top holding register 30, as described previously with regard to the STATE TIME control of the top holding register 30.

The foregoing description of the disclosed delay line correlation circuit has been based upon the TOP CLIP IN data and the BOTTOM CLIP IN data being the real time clipped output of associated hydrophones. However, an initial beam tilt can be achieved by delaying the TOP CLIP IN signal.

Although the foregoing has been a description of a specific embodiment of the disclosed invention, modifications and changes thereto can be made by persons skilled in the art without departing from the spirit and scope of the invention as defined by the following claims.

What is claimed is:

1. A delay line time compression correlation circuit utilizing a clock signal, comprising:
   control counting means responsive to the clock signal for providing a first output indicative of correlation count and a second output indicative of beam position;
   first and second storage means for sampling and storing respective input data for correlation;
   first and second recirculating means for respectively receiving data from said first and second storage means, said first and second recirculating means providing respective sample outputs;
   sample controlling means responsive to said control counting means for controlling the sampling and storing functions of said first and second storage means, and for controlling the transfer of data from said first and second storage means to said first and second recirculating means;
   correlating means responsive to said respective sample outputs for providing a series of correlation outputs; and
   correlation counting means responsive to said control counting means and said correlation output for accumulating said correlation outputs and for providing an individual accumulation output associated with each beam position, said accumulation output being provided during the correlation of a beam position other than the beam position associated with said accumulation output.

2. The correlation circuit of claim 1 wherein said control counting means comprises a binary counter providing predetermined low order output bits as said first output indicative of correlation count and predetermined output bits of higher order than said low order output bits as said second output indicative of beam position.

3. The correlation circuit of claim 1 wherein said first and second recircuating means respectively comprise first and second shift registers selectively controlled to recirculate by said sample controlling means, said first shift register having one more stage than said second shift register.

4. The correlation circuit of claim 3 wherein the number of stages in said first shift register is determined by the number of distinct states provided by said first output of said control counting means.

5. The correlation circuit of claim 1 wherein said sample controlling means allows respective new input samples to be read into said first and second storage means as a function of the change of the value of said control counting means second output indicative of beam position.

6. The correlation circuit of claim 1 wherein said correlating means comprises an exclusive NOR gate.

7. The correlation circuit of claim 1 wherein said correlation counting means includes first and second counters selectively enabled to accept said correlation outputs as inputs as a function of said control counting means first output.

8. A delay line time compression correlation circuit utilizing a clock signal, comprising:

control counting means responsive to the clock signal for providing a first output indicative of correlation count and a second output indicative of beam position;

first and second storage means for sampling and storing respective input data for correlation;

first and second recirculating means for respectively receiving data from said first and second storage means, each said first and second recirculating means synchronously providing a respective sample output on each occurrence of a predetermined transition of the clock signal, thereby providing a pair of sample outputs on each such occurrence of said predetermined clock signal transition;

sample controlling means responsive to said control counting means for controlling the sampling and storing functions of said first and second storage means, and for controlling the transfer of data from said first and second storage means to said first and second recirculating means, said sampling and storing functions sychronously occurring for said first and second storage means in response to a predetermined value of said control counting means first output; and correlation means responsive to each pair of sample outputs from said first and second recirculating means for providing a correlation result for each sample output pair, and for providing a total correlation result for a predetermined number of first and second recirculating means output pairs.

9. The correlation circuit of claim 8 wherein said sample and store functions occur on said predetermined clock signal transition under the control of said sample controlling means.

10. The correlation circuit of claim 8 wherein said first and second recirculating means respectively comprise first and second clocked shift registers selectively controlled to shift or recirculate by said sample controlling means, said first and second clock shift registers being responsive to said predetermined clock signal transition.

11. The correlation circuit of claim 8 wherein said sample controlling allows respective new input samples to be read into said first and second storage means as a function of the change of the value of said control counting means second output indicative beam position.

12. The correlation circuit of claim 8 wherein said sample controlling means comprises:

first logic means responsive to said control counting means first output for enabling first and second storage means to sample and store data in response to said predetermined value of said first output indicative of correlation count and for enabling said second recirculating means to accept data from said second storage means in response to said predetermined value of said control counting means first output; and second logic means responsive to said control counting means second output for enabling said first recirculating means to accept data from said first storage means in response to a predetermined value of said second output.

13. The correlation circuit of claim 8 wherein said correlation means includes first and second counters which are alternately enabled as a function of the change of said control counting means second output to count said correlation results.

* * * * *